US008334355B2

(12) United States Patent
Henning et al.

(10) Patent No.: US 8,334,355 B2
(45) Date of Patent: Dec. 18, 2012

(54) SILICONE-POLYETHER BLOCK COPOLYMERS HAVING A DEFINED POLYDISPERSITY IN THE POLYOXYALKYLENE PART AND THEIR USE AS STABILIZERS FOR PRODUCING POLYURETHANE FOAMS

(75) Inventors: Frauke Henning, Essen (DE); Wilfried Knott, Essen (DE); Frank Schubert, Neukirchen-Vluyn (DE); Roland Hubel, Essen (DE); Christian Eilbracht, Herne (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 12/605,699

(22) Filed: Oct. 26, 2009

(65) Prior Publication Data

US 2010/0113633 A1    May 6, 2010

(30) Foreign Application Priority Data

Oct. 31, 2008  (DE) .......................... 10 2008 043 343

(51) Int. Cl.
*C08G 77/12* (2006.01)
*C08J 9/00* (2006.01)
*C07F 7/02* (2006.01)
*C09K 3/00* (2006.01)

(52) U.S. Cl. ........ 528/31; 528/15; 521/112; 252/182.14
(58) Field of Classification Search .................. None
See application file for complete search history.

(56) References Cited

U.S. PATENT DOCUMENTS

| | | | | |
|---|---|---|---|---|
| 4,478,957 A * | 10/1984 | Klietsch et al. | ............... | 521/112 |
| 4,814,409 A * | 3/1989 | Blevins et al. | .................. | 528/25 |
| 4,906,672 A * | 3/1990 | Stone et al. | .................... | 521/130 |
| 5,391,679 A * | 2/1995 | Burkhart et al. | ................ | 528/27 |
| 5,446,114 A * | 8/1995 | O'Lenick, Jr. | .................. | 528/15 |
| 5,492,939 A * | 2/1996 | Stanga et al. | .................. | 521/112 |
| 5,523,492 A * | 6/1996 | Emanuele et al. | ............ | 568/624 |
| 5,856,369 A * | 1/1999 | Jorgenson et al. | ............ | 521/112 |
| 5,869,727 A * | 2/1999 | Crane et al. | .................... | 556/445 |
| 6,166,098 A * | 12/2000 | Burkhart et al. | ............... | 521/112 |
| 6,291,622 B1 * | 9/2001 | Drose et al. | ...................... | 528/31 |
| 6,369,187 B1 * | 4/2002 | Fujita et al. | ...................... | 528/29 |
| 6,437,162 B1 * | 8/2002 | O'Lenick, Jr. | ................ | 556/445 |
| 6,759,094 B2 * | 7/2004 | Herzig et al. | .................. | 427/387 |
| 6,987,157 B2 * | 1/2006 | Clement et al. | ................. | 528/15 |
| 7,053,166 B2 * | 5/2006 | Brehm et al. | .................... | 528/14 |
| 7,279,503 B1 * | 10/2007 | O'Lenick et al. | ............... | 516/23 |
| 7,619,035 B2 * | 11/2009 | Henning et al. | ............. | 524/838 |
| 7,718,750 B2 * | 5/2010 | O'Lenick et al. | ............... | 528/25 |
| 2002/0091219 A1 * | 7/2002 | Clement et al. | ................. | 528/10 |
| 2004/0132951 A1 * | 7/2004 | Burkhart et al. | ................ | 528/29 |
| 2005/0075468 A1 * | 4/2005 | Knott et al. | .................. | 528/15 |
| 2010/0029587 A1 * | 2/2010 | Bruckner et al. | ............... | 514/63 |
| 2010/0041910 A1 * | 2/2010 | Schubert et al. | ............... | 556/445 |
| 2010/0055649 A1 * | 3/2010 | Takahashi et al. | .............. | 434/66 |
| 2010/0056649 A1 | 3/2010 | Henning et al. | | |
| 2010/0071849 A1 * | 3/2010 | Knott et al. | .................... | 156/329 |
| 2010/0081781 A1 * | 4/2010 | Schubert et al. | ................ | 528/14 |
| 2010/0105843 A1 * | 4/2010 | Knott et al. | .................... | 525/474 |

FOREIGN PATENT DOCUMENTS

| | | |
|---|---|---|
| EP | 0 867 462 | 9/1998 |
| EP | 1 892 327 B1 | 2/2008 |
| WO | WO 2007/127004 | 11/2007 |
| WO | WO 2008/003470 | 1/2008 |

OTHER PUBLICATIONS

MacLean et al. "XXXV. Observations on Abnormal Iodine Values, with Special Reference to the Sterols and Resins.", 1921, 319-333.*
Data sheet for Oleic acid, 2 pages, no date given.*
Data sheet for Ricinoleic acid, 2 pages, no date given.*

* cited by examiner

*Primary Examiner* — Robert S Loewe
(74) *Attorney, Agent, or Firm* — Frommer Lawrence & Haug LLP

(57) ABSTRACT

Silicone-polyether block copolymers prepared by organo-modification of branched polysiloxanes having terminal and/or lateral SiH functions or linear polysiloxanes having lateral and/or terminal SiH functions by means of polyethers or polyether mixtures, characterized in that the polyethers used have a polydispersity $M_w/M_n$ in the range from 1.0 to 1.5 and/or ratios $M_n/MW_{IN}$ and $M_w/MW_{IN}$ in the range from 0.7 to 1.3, their preparation and use and also polymer articles produced therewith.

13 Claims, No Drawings

SILICONE-POLYETHER BLOCK COPOLYMERS HAVING A DEFINED POLYDISPERSITY IN THE POLYOXYALKYLENE PART AND THEIR USE AS STABILIZERS FOR PRODUCING POLYURETHANE FOAMS

This application claims benefit under 35 U.S.C. 119(a) of German patent application DE 102008043343.8, filed on Oct. 31, 2008.

Any foregoing applications including German patent application DE 10 2008 043 343.8, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Polyurethanes of various types are produced by polymerization of diisocyanates such as 4,4'-methylene-bis(phenyl isocyanate), referred to as MDI for short, or tolylene 2,4-diisocyanate, referred to as TDI for short, with polyether polyols or polyester polyols. The polyether polyols used here are obtained by alkoxylation of polyhydroxy-functional starters such as glycols, glycerol, trimethylolpropane, pentaerythritol, sorbitol or sucrose. In the production of polyurethane foams, additional blowing agents such as pentane, methylene chloride or carbon dioxide are used. Stabilization of the polyurethane foam by means of a surfactant is indispensible for the reproducible industrial production of foam parts. Apart from a few purely organic surfactants, silicone surfactants are usually used because of their higher interface stabilization potential.

BACKGROUND

The state of the art describes many different polyurethane foams, for example hot-cured flexible foam, cold-cure foam, ester foam, rigid PUR foam, rigid PIR foam and many more. The stabilizers used here have been developed to match the respective end use and usually display a significantly altered performance if they are used for producing other types of foam.

In the production of rigid polyurethane and polyisocyanurate foams, cell-stabilizing additives are used in order to obtain a fine-celled, uniform foam structure which is low in defects and thus exert a significant positive influence on the use properties of the rigid foam, in particular the thermal insulation capability. Here too, surfactants based on polyether-modified siloxanes are particularly effective and are therefore the preferred type of cell stabilizers. Since there are many different rigid foam formulations for different fields of application which meet the individual requirements which the cell stabilizer has to meet, polyether-siloxanes of a variety of structures are used. Thus, for example, the choice of blowing agent has influenced the development of new, optimized stabilizers. While EP 0570174 A1 (U.S. Pat. No. 5,169,872) still describes the production of rigid polyurethane foam using chlorofluorocarbons, further development extends through pure fluorinated hydrocarbons as blowing agents, as described in EP 0533202 A1 (CA 2078580), to pentane which is now the standard blowing agent, as described in EP 1544235 A1 (U.S. Pat. No. 7,183,330).

Flexible polyurethane foams are frequently produced using carbon dioxide as environmentally friendly blowing agent. EP 0797606 A1 (U.S. Pat. No. 5,525,640) and EP 1501889 A1 (U.S. Pat. No. 6,653,359) describe the stabilizers customarily used for this application. However, methylene chloride is still used as blowing agent in countries having less strict environmental regulations. EP 0694585 A2 (U.S. Pat. No. 5,492,939) describes stabilizers used in this case.

EP 0600261 (U.S. Pat. No. 5,321,051) is concerned with polysiloxane-polyoxyalkylene block copolymers which have different polyoxyalkylene blocks in the average molecule and are used as stabilizers for producing flexible polyurethane foams. The teaching according to the invention goes into very precise details of the composition of the polyoxyalkylene radicals represented in the average silicone-polyether copolymer in terms of their average molecular weights, their ethylene oxide/propylene oxide ratio and their individual, percentage proportions in the polyethers attached in the total matrix.

EP 0 585 771 A2 (U.S. Pat. No. 5,306,737) discloses that the polysiloxane-polyoxyalkylene block copolymers which represent particularly good foam stabilizers are characterized by a combination which can only be determined empirically of hydroxy-functional and end-capped polyoxyalkylene blocks of differing molecular weight and differing hydrophilicity or lipophilicity. Only a precisely matched ratio of hydrophilic, lipophilic and siliconophilic polymer blocks gives the stabilizer its optimum action in the respective application. Experience shows that fluctuations in the hydrophilic, lipophilic and siliconophilic components in the polysiloxane-polyoxyalkylene block copolymer caused by raw materials can give poorer compatibilization of the foam stabilizer with the reacting polyurethane matrix, which can hinder homogeneous distribution of the surfactant and subsequent migration to the interface in such a way that foam collapse is the direct consequence.

An as yet unpublished patent application DE 10 2007 055485.2 (WO 2009-065644) describes a process for preparing organomodified polysiloxanes whose siloxane chain is branched, in which a branched polysiloxane having terminal and/or lateral SiH functions is prepared in only one process step and is further functionalized by means of organic compounds, and also branched organomodified polysiloxanes prepared by this process and their use.

Most processes for preparing alkoxylation products (polyethers) make use of basic catalysts such as alkali metal hydroxides and alkali metal methoxides. The use of KOH is particularly widespread and has been known for many years. A usually low molecular weight, i.e. having a molecular weight of less than 200 g/mol, hydroxy-functional starter such as butanol, allyl alcohol, propylene glycol or glycerol is typically reacted with an alkylene oxide such as ethylene oxide, propylene oxide, butylene oxide or a mixture of various alkylene oxides in the presence of the alkaline catalyst to give a polyoxyalkylene polyether. The strongly alkaline reaction conditions in this living polymerization promote various secondary reactions. Rearrangement of propylene oxide into allyl alcohol which in turn functions as chain initiator and chain termination reactions form polyethers having a relatively broad molar mass distribution and unsaturated by-products. A method of determining the iodine number with which those skilled in the art are familiar is the method of Hanus, known as method DGF C-V 11 a (53) of the Deutsche Gesellschaft für Fette.

The iodine number in accordance with DGF C-V 11 a (53) indicates the concentration of double bonds in a defined weight of a material.

The disadvantages of the base-catalyzed alkoxylation doubtlessly also include the necessity of freeing the reaction products obtained of the active base by means of a neutralization step. Removal of the water formed in the neutralization by distillation and also removal of the salt formed by filtration are then absolutely necessary.

Apart from the base-catalyzed reaction, acid catalyses are also known for alkoxylation. Thus, DE 10 2004 007561 (US Patent Appl. Pub. 2007-185353) describes the use of $HBF_4$ and of Lewis acids such as $BF_3$, $AlCl_3$ and $SnCl_4$ in alkoxylation technology.

A disadvantage found in the acid-catalyzed polyether synthesis is the unsatisfactory regioselectivity in the ring opening of unsymmetrical oxiranes such as propylene oxide, which leads to polyoxyalkylene chains having some secondary and some primary OH termini being obtained in a manner which is not readily controlled. As in the case of the base-catalyzed alkoxylation reaction, a work-up sequence of neutralization, distillation and filtration is also indispensible here. If ethylene oxide is introduced as monomer into the acid-catalyzed polyether synthesis, the formation of dioxane as undesirable by-product has to be expected.

However, multimetal cyanide compounds or double metal cyanide catalysts, generally also referred to as DMC catalysts, are also frequently used as catalysts for preparing polyether alcohols. The use of DMC catalysts minimizes the content of unsaturated by-products, and in addition the reaction proceeds with a significantly higher space-time yield compared to the customary basic catalysts. The preparation and use of double metal cyanide complexes as alkoxylation catalysts has been known since the 1960s and is described, for example, in U.S. Pat. No. 3,427,256, U.S. Pat. No. 3,427,334, U.S. Pat. No. 3,427,335, U.S. Pat. No. 3,278,457, U.S. Pat. No. 3,278,458, U.S. Pat. No. 3,278,459. The ever more effective types of DMC catalysts which were developed in subsequent years and are described, for example, in U.S. Pat. No. 5,470,813 and U.S. Pat. No. 5,482,908 include, in particular, zinc-cobalt hexacyano complexes. Thanks to their extraordinarily high activity, only low catalyst concentrations are required for preparing polyetherols, so that the work-up step necessary for conventional alkaline catalysts, consisting of neutralization, precipitation and filtration of the catalyst, at the end of the alkoxylation process can be omitted. The alkoxylation products prepared using DMC catalysts have a much narrower molar mass distribution compared to products catalyzed by means of alkali. The high selectivity of the DMC-catalyzed alkoxylation is the reason for, for example, polyethers based on propylene oxide containing only very small proportions of unsaturated by-products.

The alkoxylation reaction carried out over DMC catalysts in direct comparison with alkali and acid catalysis is so advantageous in terms of the technical characteristics described that it has led to the development of continuous processes for preparing voluminous simple polyetherols which usually comprise only PO units. Thus, WO 98/03571 (U.S. Pat. No. 5,689,012) describes a process for the continuous preparation of polyether alcohols by means of DMC catalysts, in which a mixture of a starter and a DMC catalyst is firstly placed in a continuous stirred tank reactor, the catalyst is activated and further starter, alkylene oxides and DMC catalyst are introduced continuously into this activated mixture and, after the desired level of fill of the reactor has been reached, polyether alcohol is taken off continuously.

JP H6-16806 describes a process for the continuous preparation of polyether alcohols by means of DMC catalysts, likewise in a continuous stirred tank reactor or in a tube reactor in which an activated starter substance mixture is introduced at the inlet and alkylene oxide is fed in at various points along the tube reactor.

DD 203 725, too, describes a process for the continuous preparation of polyether alcohols by means of DMC catalysts, in which an activated starter substance mixture is introduced at the inlet of a tube reactor and alkylene oxide is fed in at various points along the tube reactor.

WO 01/62826 (U.S. Pat. No. 6,673,972), WO 01/62824 (U.S. Pat. No. 7,022,884) and WO 01/62825 (U.S. Pat. No. 6,664,428) describe specific reactors for the continuous process for preparing polyether alcohols by means of DMC catalysts.

In the case of the industrial processes described here, the patent literature places particular emphasis on the monodispersity of the polyetherol obtained by DMC processes. Thus, narrow molar mass distributions are often desirable, as in the case of the polyols utilized for PU foaming systems (DE 100 08630, U.S. Pat. No. 5,689,012).

As disclosed in U.S. Pat. No. 5,856,369 and U.S. Pat. No. 5,877,268, the high chemical purity and the high molar mass in combination with a low polydispersity of the unsaturated polyetherols prepared by means of DMC catalysts leads to highly active polyurethane foam stabilizers. However, the usability of the usually allyl alcohol-initiated polyetherols described in the field of PU foam stabilizers is restricted to a relatively small group of polyetherols which comprise ethylene oxide and propylene oxide monomer units in a sometimes randomly mixed sequence and in which the proportion of ethylene oxide must not be more than 60 mol % in order to avoid the formation of polyethylene glycol blocks in the polymer chain. To improve the solubility and thus the effectiveness of the stabilizers and also to strengthen the cell-opening action, the high molecular weight allyl polyethers which are disclosed in U.S. Pat. No. 5,856,369 and contain only 40% of ethylene oxide have to be used in combination with a molar excess of hydrophilic allylpolyethylene glycols. This restriction limits the universal usability of the relatively high molecular weight polyethers and the synthesis can be subject to fluctuations which are due to resulting incompatibilities and can lead to defective product performance or even to turbidity and phase separation (cf. copolymer 21 in U.S. Pat. No. 5,856,369).

Apart from universal usability in various formulations, the processing latitude is an important factor for determining the usefulness of a stabilizer. A wide processing latitude means that the foam properties remain constant in the event of fluctuations in the amount of starting materials introduced. The processing latitude can be determined by varying the amounts of stabilizer and catalyst used. As a person skilled in the art will know, highly active stabilizers such as the silicone-polyether copolymers described in U.S. Pat. No. 5,856,369 and U.S. Pat. No. 5,877,268 usually have a processing latitude which is too low. The patents U.S. Pat. No. 5,856,369 and U.S. Pat. No. 5,877,268 demonstrate that the use of particularly long-chain polyethers in the polyoxyalkylene part of the silicone-polyethercopolymer leads to relatively high-viscosity products which firstly have to be diluted with solvents in order to ensure normal handling.

Replacement of the polyetherols prepared by conventional alkaline catalysis by ones which have been synthesized by DMC catalysis thus gives different types of alkoxylation products whose usability as copolymer components in established silicone-polyether copolymers employed in polyurethanes is possible only to a limited extent.

To match the polyethers prepared by means of DMC catalysts to the polyetherols prepared by conventional alkaline catalysis for the purposes of making replacement easier, DE 10 2007 057145.5 (US Patent Appl. Pub. 2009-137751) teaches a method of controlling the molar mass distribution in the alkoxylation of hydroxyl compounds by epoxide monomers in the presence of double metal cyanide catalysts using specific hydrogensiloxanes and silanes which have at least one hydridic hydrogen atom bound directly to the silicon atom as additives. However, this document does not demonstrate the usability of the polyether compounds prepared with an increase in the polydispersity as copolymer components in silicone-polyethers, either in those having a branched siloxane chain or in those of the linear, laterally modified type, e.g. for flexible polyurethane foam systems.

It is an object of the present invention to prepare universally usable silicone-polyether block copolymers which have a balanced property profile in respect of their processability and ability to be formulated and a broad processing latitude and whose performance is comparable with and/or even superior to that of the established silicone-polyether copolymers.

It has now surprisingly been found that the object of the invention is achieved by preparing branched polysiloxanes having terminal and/or lateral SiH functions in only one process step or organomodifying linear polysiloxanes having lateral and/or terminal SiH functions by means of polyethers or polyether mixtures, wherein the individual polyethers of the mixture have a polydispersity $M_w/M_n$ in the range from 1.0 to 1.5 and/or ratios $M_n/MW_{IN}$ and $M_w/MW_{IN}$ in the range from 0.7 to 1.3.

Since neutralization and also a possible subsequent methylation or acetylation of an allyl polyether can lead to buildup or degradation of unsaturated by-products, the iodine number of an allyl polyether is not directly related to its polydispersity.

Assuming that each allyl-initiated polyether chain contains only one double bond, the average molecular weight of the polyether can be calculated from the iodine number. If the proportion of unsaturated by-products in the polyether increases, the iodine number likewise increases. Especially when allyl alcohol is used as starter alcohol, the alkoxylation reaction carried out under alkaline catalysis also produces propenyl polyethers. These propenyl polyethers prove to be unreactive by-products in the hydrosilylating further processing to form SiC-bonded silicone-polyether copolymers and are also, due to the hydrolytic lability of the vinyl ether bond present in them and liberation of propionaldehyde, an undesirable source of odorous impurities in the product. This is described, for example, in EP 1 431 331 A1 (US 2004-0132951).

The iodine number is thus an indication of the number of hydrosilylatable chains in the total composition of the polyether, while, secondly, the polydispersity reflects the chain length distribution in the total composition, regardless of whether these chains are hydrosilylatable or not.

It has thus surprisingly been possible to discover a distinguishing criterion which allows the usability of allyl polyethers for the preparation of industrially advantageous polyurethane foam stabilizers to be predicted.

According to the teachings of U.S. Pat. No. 5,856,369 and U.S. Pat. No. 5,877,268, small molar proportions of frequently less than 10 mol % and not more than 33 mol % of high molecular weight hydrosilylatable allyl polyethers (MW greater than 5000 g/mol or even 7000 g/mol) in a total polyether composition having a molecular weight of the mixture of from 1100 to 3000 g/mol lead to the objective of preparing polyurethane foam stabilizers. Due to the proportion of high molecular weight allyl polyether, it is necessary here to carry out blending with a very short-chain, low molecular weight polyether having a molecular weight of only 500-800 g/mol, which can result in inhomogeneities and incompatibility problems.

These teachings are contradicted by the present inventive observation that the molecular weight of the polyethers is not alone a sufficient criterion and even relatively large molar proportions of over 16 mol % and in particular over 35 mol % of relatively high molecular weight polyethers can be introduced into a formulation as long as these polyethers meet the criterion in respect of the ratios of $M_n$ and $M_w$ to the iodine number.

Thus, even polyethers having a "similar" molecular weight can be converted into polyurethane foam stabilizers with the expectation of success. The polyether blend according to the invention for the preparation of hot-cure flexible polyurethane foam stabilizers preferably contains at least 16 mol % and in particular at least 35 mol % of the relatively high molecular weight component having an average molecular weight of greater than or equal to 3000 g/mol.

A person skilled in the art would find it surprising and in no way foreseeable that modification of a silicone skeleton by means of a polyether or a polyether combination would lead to the objective of the desired foam stabilizing action, e.g. in hot-cure flexible polyurethane foam systems, only when all polyethers used have a molar mass distribution in the range from 1.0 to 1.5. Components which additionally have the ratios $M_n/MW_{IN}$ and $M_w/MW_{IN}$ of the polyethers used in the range from 0.7 to 1.3 are particularly suitable.

According to these teachings according to the invention, the polyethers used should be selected not only with regard to their average molecular weights, their ethylene oxide/propylene oxide ratio and their individual, percentage proportions in the polyethers attached in the total matrix but also with regard to their polydispersity. Thus, the polydispersity, i.e. the measure of the molar mass distribution, in polyoxyalkylene compounds is to a large extent dependent on and determined by the type of catalysis and the reaction parameters in the preparation of the polyoxyalkylene compounds.

The invention provides silicone-polyethercopolymers of the formula (I)

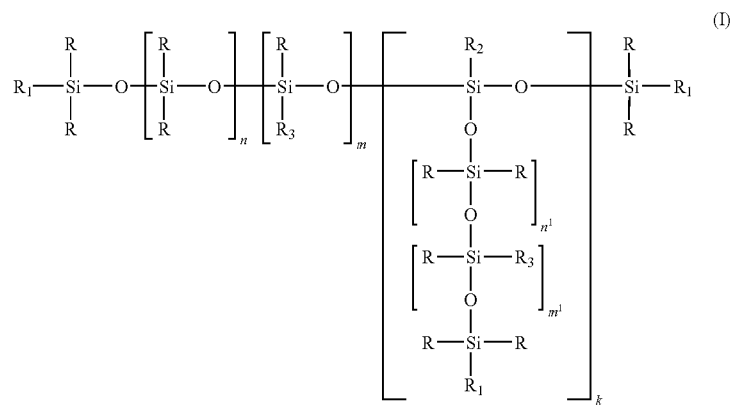

where n and $n^1$ are each, independently of one another, from 0 to 500, preferably from 10 to 200, in particular from 15 to 100, and (n+$n^1$) is <500, preferably <200, in particular <100, m and m¹ are each, independently of one another, from 0 to 60, preferably from 0 to 30, in particular from 0.1 to 25, and (m+m¹) is <60, preferably <30, in particular <25, k is from 0 to 50, preferably from 0 to 10, in particular from 1 to 7, R is at least one radical from the group consisting of linear, cyclic or branched, aliphatic or aromatic, saturated or unsaturated hydrocarbon radicals having from 1 to 20 carbon atoms, preferably a methyl radical, with particular preference being given to all radicals R being methyl radicals, $R_1$ is R or $R_3$, $R_2$ is R or a heteroatom-substituted, functional, organic, saturated or unsaturated radical, preferably a radical selected from the group consisting of alkyl, chloroalkyl, chloroaryl, fluoroalkyl, cyanoalkyl, acryloxyaryl, acryloxyalkyl, methacryloxyalkyl, methacryloxypropyl and vinyl radicals, particularly preferably a methyl, chloropropyl, vinyl or methacryloxypropyl radical, $R_3$ is R and/or $CH_2-CH_2-CH_2-O-(CH_2-CH_2O-)_x-(CH_2-CH(R')O-)_y-(SO)_z-R''$ $CH_2-CH_2-O-(CH_2-CH_2O-)_x-(CH_2-CH(R')O-)_y-R''$ $CH_2-R^{IV}$ $CH_2-CH_2-(O)_{x'}-R^{IV}$ $CH_2-CH_2-CH_2-O-CH_2-CH(OH)-CH_2OH$

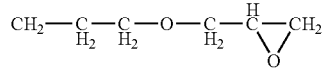

$CH_2-CH_2-CH_2-O-CH_2-C(CH_2OH)_2-CH_2-CH_3$, where x=0 to 100, preferably from 0 to 50, x'=0 or 1, y=0 to 100, preferably from 0 to 50, z=0 to 100, preferably from 0 to 10, R' is an alkyl or aryl group which has from 1 to 12 carbon atoms and is unsubstituted or substituted, for example by alkyl radicals, aryl radicals or haloalkyl or haloaryl radicals, and R'' is a hydrogen radical or an alkyl group having from 1 to 4 carbon atoms, a —C(O)—R''' group where R'''=alkyl radical, a —CH$_2$—O—R' group, an alkylaryl group, e.g. a benzyl group, the —C(O)NH—R' group, $R^{IV}$ is a hydrocarbon radical which has from 1 to 50, preferably from 9 to 45, more preferably from 13 to 37, carbon atoms and is unsubstituted or substituted, e.g. by halogens, SO is a styrene oxide radical —CH(C$_6$H$_5$)—CH$_2$—O—, with the proviso that at least one substituent from among $R_1$, $R_2$ and $R_3$ is not R and that at least one substituent from among $R_1$, $R_2$ and $R_3$ is a polyether which has a polydispersity $M_w/M_n$ in the range from 1.0 to 1.5 and/or ratios $M_n/MW_{IN}$ and $M_w/MW_{IN}$ in the range from 0.7 to 1.3. The various monomer units of the siloxane chain and also of the polyoxyalkylene chain can be arranged in blocks or be randomly distributed.

Particular preference is given to silicone-polyether copolymers of the formula (I) in which k is from 1 to 7 and $R_1$ is different from R.

The indices in the formulae shown here and the value ranges given for the indices are therefore the averages of the possible statistical distribution of the actual isolated structures and/or mixtures thereof.

The invention further provides compositions or mixtures of the silicone-polyether copolymers according to the invention of the formula (I) with one another and mixtures of the foam stabilizers according to the invention with further additives, for example nucleating agents, i.e. cell-refining additives, cell openers, crosslinkers, emulsifiers, flame retardants, antioxidants, antistatics, biocides, colour pastes, solid fillers, and/or with amine catalysts, metal catalysts and/or buffer substances.

The silicone-polyether block copolymers according to the invention of the formula (I) are particularly suitable as polyurethane foam stabilizers in fields of application such as flexible polyurethane foam, viscoelastic flexible foam, rigid polyurethane foam, cold-cure polyurethane foam, ester foam or high resilience foam (HR foam).

The polyurethane foams produced using the silicone-polyether block copolymers of the invention are particularly suitable for producing, for example, polymer articles containing polyurethane foams, e.g. furniture upholstery, refrigerator insulation, spray foams or metal composite elements for (structural) insulation, and also polymer articles which consist essentially of the polyurethane foam, e.g. mattresses or automobile seats; the listings are to be considered to be overlapping and not to be exhaustive.

The invention likewise provides blends or compositions of the silicone-polyether copolymers according to the invention of the formula (I) with solvents such as glycols, alkoxylates, carbonates, ethers, esters, branched and linear aliphatic and aromatic hydrocarbons or oils of synthetic and/or natural origin.

The polysiloxane-polyoxyalkylene block copolymers which form the basis of the invention can be prepared by noble metal-catalyzed hydrosilylation of the linear or branched hydrogensiloxanes of the formula (II) by means of allyl polyethers which are prepared, for example, as described in EP 1 520 870 (US Patent Appl. Pub. 2005-075468),

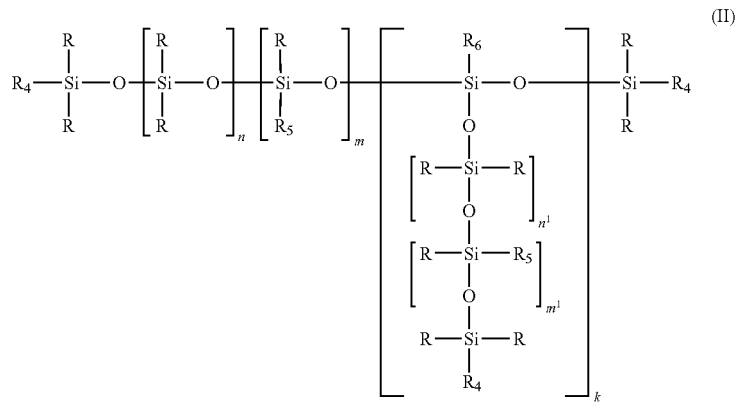

where n and $n^1$ are each, independently of one another, from 0 to 500, preferably from 10 to 200, in particular from 15 to 100, and $(n+n^1)$ is <500, preferably <200, in particular <100, m and $m^1$ are each, independently of one another, from 0 to 60, preferably from 0 to 30, in particular from 0.1 to 25, and $(m+m^1)$ is <60, preferably <30, in particular <25, k is from 0 to 50, preferably from 0 to 10, in particular from 1 to 7, R is at least one radical from the group consisting of linear, cyclic or branched, aliphatic or aromatic, saturated or unsaturated hydrocarbon radicals having from 1 to 20 carbon atoms, preferably a methyl radical, with particular preference being given to all radicals R being methyl radicals, the radicals $R_4$ are each, independently of one another, hydrogen or R, the radicals $R_5$ are each, independently of one another, hydrogen or R, the radicals $R_6$ are each, independently of one another, hydrogen, R or a heteroatom-substituted, functional, organic, saturated or unsaturated radical, preferably a radical selected from the group consisting of alkyl, chloroalkyl, chloroaryl, fluoroalkyl, cyanoalkyl, acryloxyaryl, acryloxyalkyl, methacryloxyalkyl, methacryloxypropyl and vinyl radicals, particularly preferably a methyl, chloropropyl, vinyl or methacryloxypropyl radical, with the proviso that at least one substituent among $R_4$, $R_5$ and $R_6$ is not R.

The hydrogen siloxanes used in the preparation of the polysiloxane-polyoxyalkylene block copolymers can likewise be prepared as described in the prior art, for example in EP 1439200 B1 (US Patent Appl. Pub. 2004-147703) and in the as yet unpublished patent application DE 10 2007 055485.2 (WO 2009-065644). The unsaturated polyoxyalkylenes used can be prepared by the literature method of alkaline alkoxylation of allyl alcohol or using DMC catalysts as described in the prior art, for example in DE 10 2007 057145.5 (US 2009-137751).

The polyurethane foams according to the invention can be produced using formulations and methods known from the prior art with in each case foams produced in parallel with addition of established foam stabilizers as reference.

The polyurethane foam can be produced in combination with water, methylene chloride, pentane, alkanes, halogenated alkanes, acetone or carbon dioxide as preferred physically acting blowing agents.

Further subjects of the invention are characterized by the contents of the claims, whose contents are fully incorporated by reference into the disclosure content of the present description.

The foam stabilizers according to the invention and their use are described by way of example below without the invention being restricted to these illustrative embodiments. Where ranges, general formulae or classes of compounds are indicated below, these are intended to encompass not only the ranges or groups of compounds which are explicitly mentioned but also all subranges and subgroups of compounds which can be obtained by leaving out individual values (ranges) or compounds. Where documents are cited in the present description, their contents are fully incorporated by reference into the disclosure content of the present invention.

EXAMPLES

In the examples, hydrogen siloxanes having the formula (II) of the linear type, S1, and of the branched type, S2, S3 and S4, are used:

TABLE 1

| Siloxane | R | $R_4$ | $R_5$ | $R_6$ | n + n1 | m + m1 | k |
|---|---|---|---|---|---|---|---|
| S1 | $CH_3$ | $CH_3$ | H | $CH_3$ | 71 | 7 | 0 |
| S2 | $CH_3$ | H | $CH_3$ | $CH_3$ | 64 | 0 | 7* |
| S3 | $CH_3$ | H | $CH_3$ | $CH_3$ | 64 | 0 | 5* |
| S4 | $CH_3$ | H $CH_3$ (1:1) | H | $CH_3$ | 64.5 | 3.5 | 5* |

*The theoretical degree of branching k indicated here is derived from the weights of starting materials. As can be seen from DE 10 2007 055485.2, the measured degrees of branching $k_{real}$ can deviate by up to 30% from the theoretical degrees of branching due to the analytical inaccuracy of the $^{29}$Si-NMR measurement and as a result of process fluctuations in the preparation.

The polyethers used (referred to as PE for short in Table 2) in each case have an allyl ether function and a methyl ether function at the ends of the chain and are characterized by different proportions by weight of EO/PO, molecular weights and polydispersities. GPC measurements to determine the polydispersity and average molar masses were carried out under the following measurement conditions: column combination SDV 1000/10000 Å (length 65 cm), temperature 30° C., THF as mobile phase, flow rate 1 ml/min, sample concentration 10 g/l, RI detector, evaluation against polypropylene glycol standard.

The iodine numbers [g of iodine/100 g of sample] were determined by the method of Hanus, known as method DGF C-V 11 a (53) of the Deutsche Gesellschaft für Fette, and converted into the molar masses $MW_{IN}$ of the respective polyethers.

$$MW_{IN} = \frac{253,81 [g/mol] * 100}{IN [g/100\ g]}$$

TABLE 2

| PE | % by weight of PO | % by weight of EO | $M_n$ g/mol | $M_w$ g/mol | $M_w/M_n$ | $MW_{IN}$ g/mol | $M_n/MW_{IN}$ | $M_w/MW_{IN}$ |
|---|---|---|---|---|---|---|---|---|
| 1A | 26 | 74 | 779 | 854 | 1.10 | 875 | 0.89 | 0.98 |
| 1B | 26 | 74 | 863 | 964 | 1.12 | 947 | 0.91 | 1.02 |
| 1C | 26 | 74 | 870 | 918 | 1.05 | 957 | 0.91 | 0.96 |
| 2A | 58 | 42 | 1266 | 1398 | 1.10 | 1418 | 0.89 | 0.99 |
| 2B | 58 | 42 | 1420 | 1692 | 1.19 | 1519 | 0.93 | 1.11 |
| 2C | 58 | 42 | 1433 | 1554 | 1.08 | 1637 | 0.88 | 0.95 |
| 3A | 58 | 42 | 2990 | 3737 | 1.25 | 3678 | 0.81 | 1.02 |
| 3B | 58 | 42 | 3585 | 6157 | 1.72 | 4028 | 0.89 | 1.53 |
| 3C | 58 | 42 | 3864 | 4233 | 1.10 | 4028 | 0.96 | 1.05 |
| 3D | 58 | 42 | 4160 | 4854 | 1.17 | 3904 | 1.06 | 1.24 |
| 3E | 58 | 42 | 3575 | 4970 | 1.39 | 3853 | 0.93 | 1.29 |

The polyether-modified siloxanes of the invention are prepared by means of hydrosilylation using the same method in each case. Three polyethers, namely a low molecular weight polyether of the 1A-1C type, a higher molecular weight polyether of the 2A-2C type and a high molecular weight polyether of the 3A-3E type are in each case coupled to the hydrogen siloxanes by an SiC bond in a constant molar ratio based on $MW_{IN}$ to one another. The constant molar ratio is 35 parts of type 1A-1C, 20 parts of type 2A-2C and 45 parts of type 3A-3E. The products based on a particular siloxane vary only in the polydispersity of the allyl polyether. Products having viscosities in the range from 1400 to 5000 mPa*s are obtained.

TABLE 3

| Example | Siloxane used | Polyether used | Appearance | Viscosity mPa*s |
|---|---|---|---|---|
| 1 | S1 | 1A/2A/3A | clear | 2535 |
| 2 | S2 | 1A/2A/3A | clear | 1525 |
| 3 | S1 | 2B/2B/3B | turbid | 4665 |
| 4 | S2 | 2B/2B/3B | turbid | 2737 |
| 5 | S1 | 1C/2C/3C | slightly turbid | 3518 |
| 6 | S2 | 1C/2C/3C | slightly turbid | 2404 |
| 7 | S2 | 1A/2A/3D | clear | 2652 |
| 8 | S2 | 1A/2A/3B | slightly turbid | 2997 |
| 9 | S2 | 1A/2A/3E | slightly turbid | 2036 |
| 10 | S3 | 1A/2A/3A | clear | 1340 |
| 11 | S4 | 1A/2A/3A | clear | 1499 |
| 12 | Mixture of 50% of Ex. 1 and 50% of Ex. 2 | | clear | |

The polyorganosiloxanes of the invention are suitable for use as foam stabilizer in flexible polyurethane foams, as a use comparison with conventional polyether-siloxanes which represent the prior art shows. A typical formulation for producing flexible polyurethane foams is based on one or more organic isocyanates having two or more isocyanate functions, one or more polyols having two or more groups which are reactive toward isocyanate, catalysts for the isocyanate-polyol and/or isocyanate-water and/or isocyanate trimerization reactions, polyether-siloxane foam stabilizers, water, optional physical blowing agents, optional flame retardants and, if appropriate, further additives.

For the use comparison of foam stabilizers according to the invention and conventional foam stabilizers, a flexible polyurethane foam was produced in a 27 cm×27 cm open wooden box having a wall height of 27 cm by foaming of a polyurethane formulation having the following constituents:

| | | |
|---|---|---|
| 100 | parts | of trifunctional polypropylene glycol, Desmophen VPPU 20 WB 01 from Bayer Material Science AG |
| 5.0 | parts | of water |
| 0.15 | part | of amine catalyst*1 |
| 0.23 | part | of tin catalyst*2 |
| 5.0 | parts | of a physical blowing agent (dichloromethane) |
| 0.8 | part | of foam stabilizer |
| or 1.0 | part | and tolylene diisocyanate Index 115 (TDI 80/20) from Bayer Material Science AG. |

*1 TEGOAMIN ® 33, obtainable from Evonik Goldschmidt GmbH, which is a 33% strength solution of triethylenediamine in dipropylene glycol
*2 KOSMOS ® 29, obtainable from Evonik Goldschmidt GmbH, which is the tin(II) salt of ethylhexanoic acid.

The foam stabilizers according to the invention from Examples 1 to 10 are used here. Tegostab BF 2270 serves as reference. The most important property of the polyether-siloxanes of the invention is their ability to stabilize the rising polyurethane foam so that the still soft polymer mass does not collapse before curing. The stabilizing effect is assessed by means of the decreasing height of the foam after the end of the rise phase and is the measure used for comparing the stabilizers with one another. Further desired properties such as a high degree of cell fineness and an open, regular cell structure of the foam can be achieved by formulation measures according to the prior art, as described, for example, in EP 1211279 A1 (U.S. Pat. No. 6,506,810) or EP 0930324 A1 (U.S. Pat. No. 5,852,065) by addition of cell openers and/or nucleating agents. The following examples do not expressly take into account the cell fineness but instead focus on the stabilizer activity and the proportion of open cells, which in the following is also referred to as porosity. The cell finenesses measured in the examples are in the range from 4 to 8 cells/cm and can be increased to 12 cells/cm by adding a suitable nucleating agent during foaming.

The foams produced were assessed in terms of the following physical properties:
1) Decreasing height of the foam after the end of the rise phase (=settling).
2) Foam density (FD)
3) The porosity, i.e. the air permeability, of the foam was determined by means of a banking-up pressure measurement on the foam. The measured banking-up pressure was reported in mm of water, with the lower banking-up pressure values then characterizing the more open foam. The values measured were in the range from 0 to 300 mm.

The following results were obtained:

TABLE 4

| | Settling [cm] | Foam density [kg/m³] | Porosity [mm of water] |
|---|---|---|---|
| 0.8 part of stabilizer | | | |
| Tegostab BF 2270 | −0.8 | 17.9 | 46 |
| Example 1 | −0.0 | 17.4 | 151 |
| Example 2 | −2.2 | 18.5 | 12 |
| Example 3 | Collapse | — | — |
| Example 4 | −5.4 | 20.1 | 8 |
| Example 5 | +0.8 | 17.1 | 241 |
| Example 6 | −2.4 | 18.6 | 15 |
| Example 7 | −3.3 | not determined | 8 |
| Example 8 | −4.5 | not determined | 5 |
| Example 9 | −2.5 | not determined | 9 |
| 0.6 part of stabilizer | | | |
| Example 10 | −2.4 | 18.75 | 9 |
| Example 11 | −1.0 | not determined | 15 |

It is clear from the results in Table 4 that Examples 3, 4 and 8 which are not according to the invention and contain a polyether having a polydispersity of >1.5 and/or a ratio $M_w/MW_{IN}$ of >1.3 display the highest settling values and thus the least ability to stabilize the foam. Furthermore, it is clear that Examples 2, 4, 6, 7, 9, 10 and 11 according to the invention which have at least one branch in the silicone part lead to open-celled foams, which is an indication of a broad processing latitude.

To check the processing latitude, the amount of stabilizer used and the amount of tin catalyst (Kosmos®29) used were varied in the following polyurethane foam formulation.

| | |
|---|---|
| 100 parts | of a polyol having an OHM of 47 |
| 4.1 parts | of water |
| 0.2 part | of DMEA |
| 0.14 to 0.24 part | of tin catalyst |
| 2.5 parts | of a physical blowing agent (dichloromethane) |
| 0.8 to 1.1 parts | of foam stabilizer |
| | and tolylene diisocyanate Index 112.5 (TDI 80/20) from Bayer Material Science AG. |

TABLE 5

| Stabilizer | Parts | Settling [cm] | Foam density [kg/m³] | Porosity [mm of water] |
|---|---|---|---|---|
| Tegostab BF 2270 | 1.1 | 0.0 | 22.20 | 58 |
| | 0.8 | −0.1 | 22.65 | 35 |
| | 0.6 | −0.8 | 23.55 | 18 |
| Example 2 | 1.1 | −0.4 | 23.25 | 15 |
| | 0.8 | −0.7 | 23.50 | 13 |
| | 0.6 | −1.4 | 23.65 | 9 |

TABLE 6

| Stabilizer 1.0 part | Parts of Zn cat | Settling [cm] | Foam density [kg/m³] | Porosity [mm of water |
|---|---|---|---|---|
| Tegostab BF 2270 | 0.14 | 0.0 | 22.55 | 22 |
| | 0.16 | 0.0 | 22.35 | 36 |

TABLE 6-continued

| Stabilizer 1.0 part | Parts of Zn cat | Settling [cm] | Foam density [kg/m³] | Porosity [mm of water |
|---|---|---|---|---|
| | 0.20 | +0.4 | 23.25 | 78 |
| | 0.24 | 0.0 | 21.60 | 172 |
| Example 2 | 0.14 | −0.7 | 23.35 | 12 |
| | 0.16 | −0.6 | 23.10 | 16 |
| | 0.20 | 0.0 | 22.90 | 29 |
| | 0.24 | 0.0 | 22.20 | 74 |

It is clear from the results in Tables 5 and 6 that Example 2 according to the invention displays a slightly improved processing latitude compared to an established foam stabilizer, since the open-celled nature is ensured over a wide dosage range without the foam yield and the foam quality being adversely affected.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A silicone-polyether copolymer:

prepared by organomodification of branched polysiloxanes having terminal and/or lateral SiH functions or linear polysiloxanes having lateral and/or terminal SiH functions by means of polyethers or polyether mixtures;

wherein the polyethers used have a polydispersity $M_w/M_n$ in the range from 1.0 to 1.5 and ratios $M_n/WM_{IN}$ and $M_w/MW_{IN}$ in the range from 0.7 to 1.3.

2. The silicone-polyether copolymers according to claim 1;

wherein the polysiloxane after organomodification is a silicone-polyether copolymer of the formula (I);

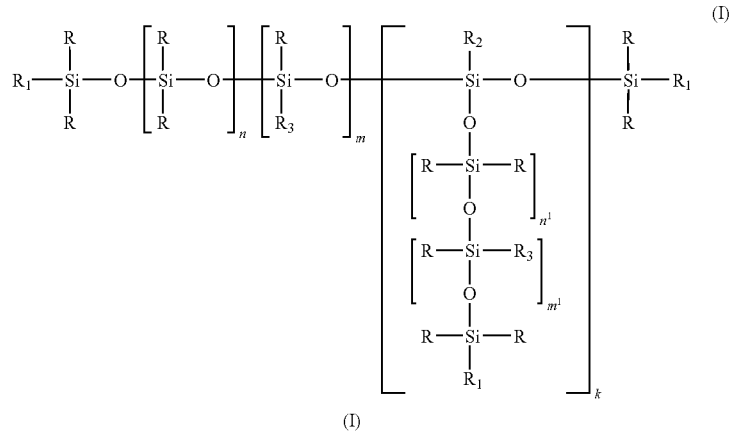

where:

n and $n^1$ are each, independently of one another, from 0 to 500 and ($n+n^1$) is <500, m and $m^1$ are each, independently of one another, from 0 to 60 and ($m+m^1$) is <60, k is from 0 to 50, R is at least one radical from the group consisting of linear, cyclic or branched, aliphatic or aromatic, saturated or unsaturated hydrocarbon radicals having from 1 to 20 carbon atoms, $R_1$ is R or $R_3$, $R_2$ is R or a heteroatom-substituted, functional, organic, saturated or unsaturated radical, $R_3$ is selected from:
R;
$CH_2$—$CH_2$—$CH_2$—O—($CH_2$—$CH_2O$—)$_x$—($CH_2$—$C_H(R')O$—)$_y$—$(SO)_z$—R";
$CH_2$—$CH_2$—O—($CH_2$—$CH_2O$—)$_x$—($CH_2$—$CH(R')O$—)$_y$—R";
$CH_2$—$R^{IV}$;
$CH_2CH_2$—(O)$_{x'}$—$R^{IV}$;
$CH_2$—$CH_2$—$CH_2$—O—$CH_2$—CH(OH)—$CH_2OH$;

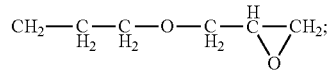

and
$CH_2$—$CH_2$—$CH_2$—O—$CH_2$—$C(CH_2OH)_2$—$CH_2$—$CH_3$;

where:
x=0 to 100,
x'=0 or 1,
y=0 to 100,
z=0 to 100,
R' is an alkyl or aryl group which has from 1 to 12 carbon atoms and is unsubstituted or substituted;
R" is a hydrogen radical or an alkyl group having from 1 to 4 carbon atoms, a —C(O)—R'" group where R'" alkyl radical, a —CH, —O—R' group, an alkylaryl group, or the —C(O)NH—R' group;
$R^{IV}$ is a hydrocarbon radical which has from 1 to 50 carbon atoms and is unsubstituted or substituted;
SO is a styrene oxide radical —$CH(C_6H_5)$—$CH_2$—O—;

with the proviso that
at least one substituent from among $R_1$, $R_2$, and $R_3$ is not R; and
at least one substituent from among $R_1$, $R_2$, and $R_3$ is a polyether which has a polydispersity $M_w/M_n$ in the range from 1.0 to 1.5 and ratios $M_n/MW_{IN}$ and $M_w/MW_{IN}$ in the range from 0.7 to 1.3.

3. The silicone-polyether copolymers or mixtures thereof according to claim 2 having the formula (I);
wherein:
k is >0; and
$R_1$ is different from R.

4. The silicone-polyether copolymers according to claim 2;
wherein:
R is a methyl group;
$R_2$ is R or a radical selected from the group consisting of alkyl, chloroalkyl, chloroaryl, fluoroalkyl, cyanoalkyl, acryloxyaryl, acryloxyalkyl, methacryloxyalkyl, methacryloxypropyl, and vinyl radicals;
R' is an alkyl or aryl group which has from 1 to 12 carbon atoms and is unsubstituted or substituted, alkyl radicals, aryl radicals; or haloalkyl or haloaryl radicals;
R" is a hydrogen radical or an alkyl group having from 1 to 4 carbon atoms, a —C(O)—R'" group where R'"=alkyl radical, a —$CH_2O$—R' group, an alkylaryl group, a benzyl group, or the —C(O)NH—R' group; and
$R^{IV}$ is a hydrocarbon radical which has from 1 to 50 carbon atoms and is unsubstituted or substituted by halogens;
with the proviso that:
at least one substituent from among $R_1$, $R_2$; and $R_3$ is not R; and
at least one substituent from among $R_1$, $R_2$, and $R_3$ is a polyether which has a polydispersity $M_w/M_n$ in the range from 1.0 to 1.5 and ratios $M_n/MW_{IN}$ and $M_w/MW_{IN}$ in the range from 0.7 to 1.3.

5. The silicone-polyether copolymers according to claim 2;
wherein:
all radicals R are methyl radicals;
$R_2$ is R or a radical selected from the group consisting of methyl, chloropropyl, vinyl, and methacryloxypropyl radicals;
R' is an alkyl or aryl group which has from 1 to 12 carbon atoms and are alkyl radicals, aryl radicals, or haloalkyl or haloaryl radicals;
R" is a hydrogen radical or an alkyl group having from 1 to 4 carbon atoms, a —C(O)—R'" group where R'"=alkyl radical, a —$CH_2$—O—R' group, a benzyl group, or the —C(O)NH—R' group; and
$R^{IV}$ is a hydrocarbon radical which has from 1 to 50 carbon atoms and is unsubstituted or substituted, by halogens
with the proviso that
at least one substituent from among $R_1$, $R_2$, $R_3$ is not R; and
least one substituent from among $R_1$, $R_2$, and $R_3$ is a polyether which has a polydispersity $M_w/M_n$ in the range from 1.0 to 1.5 and ratios $M_n/MW_{IN}$ and $M_wM_{W_{IN}}$ in the range from 0.7 to 1.3.

6. The silicone-polyether copolymers according to claim 2:
wherein:
each radical R is a methyl radical;
$R_2$ is R or a heteroatom-substituted, functional, organic, saturated or unsaturated radical, selected from the group consisting of alkyl, chloroalkyl, chloroaryl, fluoroalkyl, cyanoalkyl, acryloxyaryl, acryloxyalkyl, methacryloxyalkyl, methacryloxypropyl, vinyl radicals, methyl, chloropropyl, vinyl, and methacryloxypropyl radicals.

7. A composition comprising:
one or more silicone-polyether copolymers according to claim 1 optionally with further additives.

8. A composition comprising:
one or more silicone-polyether copolymers according to claim 1 as polyurethane foam stabilizer(s); and
further additives selected from the group consisting of nucleating agents, cell-refining additives, cell openers, crosslinkers, emulsifiers, amine catalysts, metal catalysts, buffer substances, flame retardants, antioxidants, antistatics, biocides, colour pastes, and solid fillers for stabilizing polyurethane foams.

9. A composition containing:
silicone-polyether copolymers according to claim 8; and
solvents selected from the group consisting of glycols, alkoxylates, carbonates, ethers, esters, branched and linear aliphatic and aromatic hydrocarbons, and oils of synthetic and/or natural origin.

10. A method of stabilizing a polyurethane foam which comprises:
adding a silicone-polyether copolymer of claim 1 to a polyurethane foam.

11. A method for foaming a polyurethane foam comprising:
   combining a silicone-polyether copolymer according to claim 1 with a blowing agent selected from the group consisting of water, methylene chloride, pentane, alkanes, halogenated alkanes, acetone, and carbon dioxide.

12. A polyurethane foam stabilized using a silicone-polyether copolymer according to claim 1.

13. A polymer article consisting of:
   a polyurethane foam according to claim 12.

* * * * *